July 27, 1954   R. C. CATHCART   2,685,026
MAGNETIC PULSE GENERATOR AND DEPTH FINDER SYSTEM
Filed Feb. 15, 1951   3 Sheets-Sheet 1
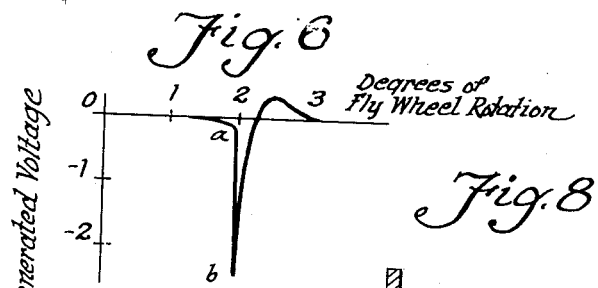
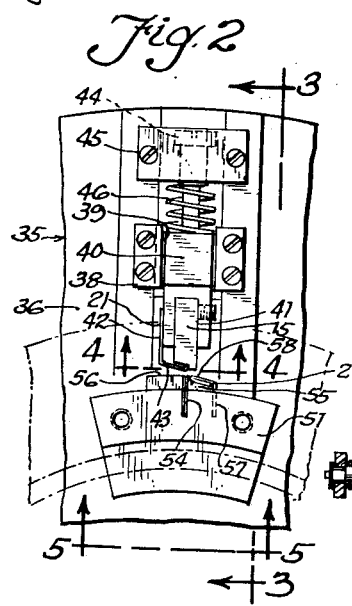
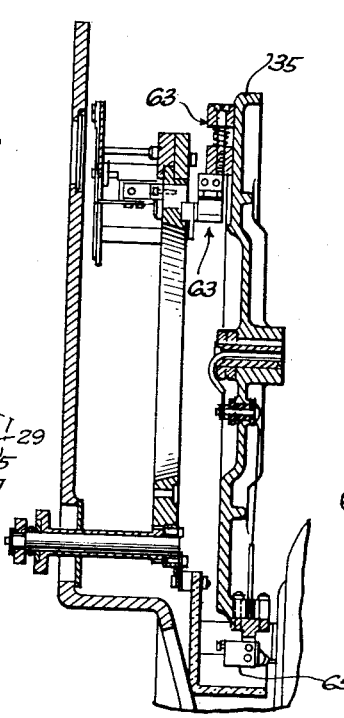
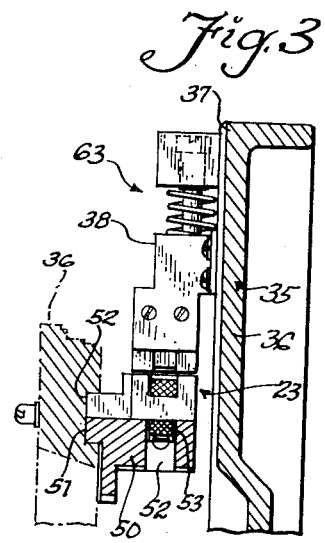
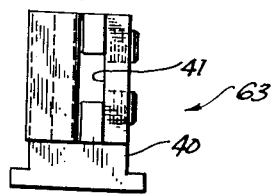
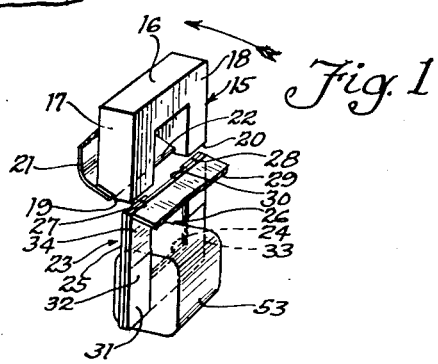
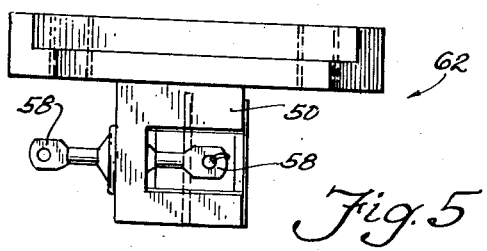
INVENTOR.
Richard C. Cathcart
BY
Attorneys July 27, 1954 R. C. CATHCART 2,685,026
MAGNETIC PULSE GENERATOR AND DEPTH FINDER SYSTEM
Filed Feb. 15, 1951 3 Sheets-Sheet 2

INVENTOR.
Richard C. Cathcart

July 27, 1954     R. C. CATHCART     2,685,026
MAGNETIC PULSE GENERATOR AND DEPTH FINDER SYSTEM
Filed Feb. 15, 1951     3 Sheets-Sheet 3

INVENTOR.
Richard C. Cathcart
BY
Attorneys

Patented July 27, 1954

2,685,026

UNITED STATES PATENT OFFICE 2,685,026

MAGNETIC PULSE GENERATOR AND DEPTH FINDER SYSTEM

Richard C. Cathcart, Chicago, Ill., assignor, by mesne assignments, to National-Simplex-Bludworth, Inc., New York, N. Y., a corporation of Delaware Application February 15, 1951, Serial No. 211,057

17 Claims. (Cl. 250—27)

The present invention relates to timing by means of periodically generated electric impulses. More specifically, it relates to timing of generation of such electric impulses by means of bodies that are relatively movable in a cyclic fashion whereby cooperative electric elements are brought into cooperative relation periodically and at preselected intervals. Heretofore, the common practice has been to accomplish timing of this type by electrically conductive contactors that are periodically brought into and out of contact at preselected points of the cycles of the relatively movable bodies. Such devices have not been wholly satisfactory due to such causes as pitting of the contact surfaces, misalignment, or foreign matter lodging between them. Additionally, due to friction between wiping surfaces, such devices are short lived. One aspect of the invention relates to generation of voltage pulses in preselected timed sequence by non-contacting means including a magnetic element that is mounted on one of the relatively movable bodies and a pickup device that is mounted on the other body and that includes magnetic circuit means and a coil linked therewith for induction of a voltage in the coil when the magnetic circuit means pass through the field of the magnetic element. For accurate timing, in many fields of use a voltage having a very rapid rate of magnitude change is needed. The normal spreading characteristics of a magnetic field are such that a magnetically permeable pickup device of the kind generally described above is energized at a gradually increasing amplitude as the magnetic core means of the device moves into the field of the magnetic element. In accordance with the invention a magnetic element assembly and a pickup assembly are so arranged that the magnetic field of the former is distorted to a form having a quite sharply defined margin which is suddenly crossed by the pickup element to produce a sudden and substantial change of voltage in a coil linked with the pickup element. Additionally, in accordance with the invention the magnetic circuit element of the pickup device may be shielded to increase the suddenness of its crossing of a sharply defined magnetic field boundary.

A second aspect of the invention relates to an amplifying stage having an input connected with the coil of a pickup device of the kind in question and arranged to modify the voltage output pulse of the coil to a form that is more satisfactory for triggering purposes as well as being amplified to a substantial degree.

A third aspect of the invention relates to the specific field of distance measuring by transmission of supersonic mechanical vibrations, detection of the vibrations after reflection from a target, and measurement of the lapse of time between commencement of the transmission and commencement of receipt of the reflected vibrations. This field of activity is typified by marine depth finding and recording.

The primary object of the invention is the provision of a novel combination of a magnetic element assembly and a magnetic pickup device, each of which is arranged for sudden energization of the pickup device to produce a sharply changing output voltage. Another object is to provide a novel magnetic element assembly for such a combination and to provide a novel pickup assembly for such a combination.

Still another object is the provision of a novel shielding arrangement that may be applied to both a magnetic element and to the core piece of a magnetic pickup assembly that is effective when the two assemblies are brought into passing relation to shield the core piece from magnetization by a field of gradually changing intensity but to so shape the field and so shield the core piece that the magnetic field changes in intensity sharply in the direction of passing of the assemblies.

Still another object is to provide a novel combination of a magnetic voltage pulse generator and an amplifying and pulse shaping stage.

An additional object is the provision of a novel system for energizing at accurately timed intervals the transmitter of a supersonic vibration generator or transmitter.

In the accompanying drawings,

Fig. 1 is a somewhat schematic view of a magnetic element assembly and a pickup device arranged in accordance with the invention, the assemblies being shown in fragmentary form and in perspective.

Fig. 2 is a fragmentary front elevation of a magnetic structural arrangement employing assemblies such as those disclosed in Fig. 1, and showing details of mountings for them.

Fig. 3 is a section on line 3—3 of Fig. 2.

Fig. 4 is a detailed bottom plan of the magnetic element assembly as shown by line 4—4 of Fig. 2.

Fig. 5 is a detailed bottom plane of the pickup assembly as indicated by line 5—5 of Fig. 2.

Fig. 6 is a graph showing a typical voltage pulse generated by an assembly such as that of Figs. 1 to 5.

Fig. 8 is a section on line 8—8 of Fig. 7.

Figure 7:
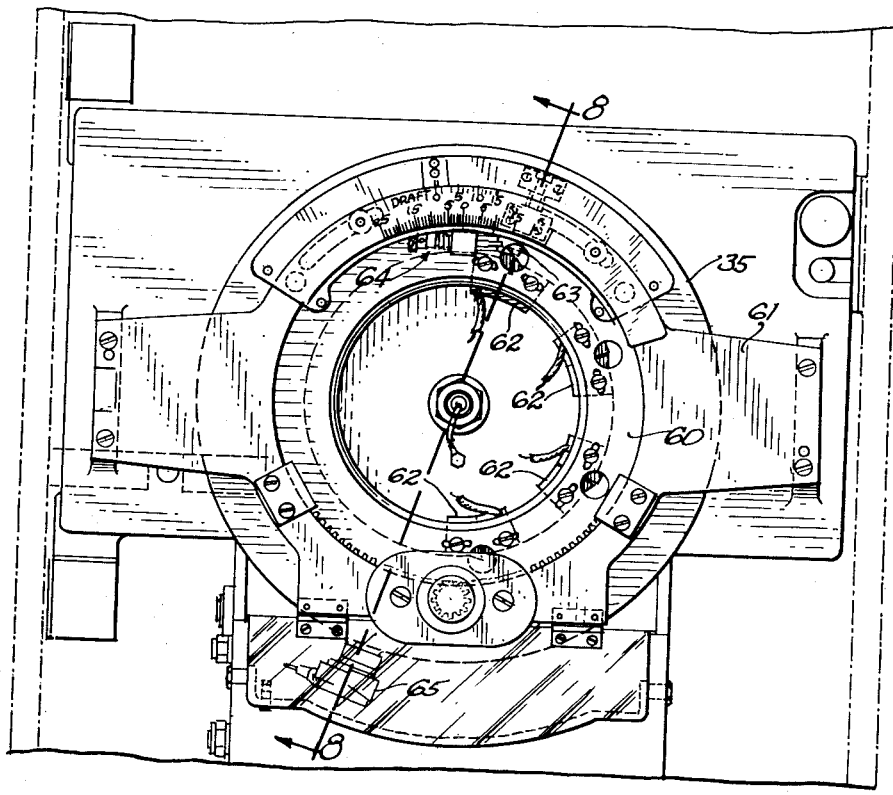
Fig. 7 is a front elevation of a depth finder and recorder provided with a system of timing voltage pulse generation arranged in accordance with the invention.

Describing the drawings in detail, and first referring to Fig. 1, a magnetic element is designated 15. Conveniently, this magnetic element is a permanent magnet although obviously it might be an electro-magnet. The magnet 15 is of squared horseshoe form and is substantially U-shaped having a cross arm 16 and a pair of side arms 17, 18. The side arms respectively have at their ends substantially coplanar polar surfaces 19, 20. As will be made clear, the magnetic element 15 is supported for movement relative to a pickup assembly, with leading margins of surfaces of each first approaching one another and trailing margins subsequently receding from one another. Hereinafter the leading and trailing margins are sometimes referred to as "corresponding" margins of the respective elements, and it is associated with means arranged to make the magnetic field at either its leading side or its trailing side, with respect to direction of relative movement, extend substantially along a plane that is at right angles to the plane of the surfaces 19, 20. In the illustrated arrangement, the leading magnetic field boundary is so shaped. To accomplish this shaping of the leading marginal portion of the magnetic field, a magnetically permeable shield 21 has a surface shown as an edge 22 that extends closely adjacent but narrowly spaced from the leading margins of surfaces 19, 20, and that extends at least between the relatively outer margins of those surfaces. It will be understood that magnetic element 15 is so supported that its arms are spaced transversely with respect to the direction of relative movement between it and the pickup assembly.

The pickup assembly comprises a substantial U-shaped core piece that preferably is very thin in the direction of travel relative to the magnetic element. This core piece, as shown, includes a main substantially U-shaped member 23 that has a cross arm 24 and side arms 25 and 26 that have terminal surfaces 27, 28 disposed to pass through the field of magnetic element 15. Preferably, arms 25, 26 are of widths corresponding to the widths of the magnetic element arms 17, 18, and are spaced similarly to such arms so that terminal surfaces 27, 28 of the core piece side arms pass through registration with polar surfaces 19, 20, when the two assemblies pass. However, a lateral displacement from such registration of the limited magnitude normally encountered in practice does not seriously affect operation. Associated with the core piece 23 is a highly permeable shield 29 that is so positionally related to the terminal surfaces 27, 28, as to shield them from stray portions of the magnetic field that escape the magnetic element shield 21, thereby contributing to suddenness of change in magnetic field intensity to which core piece 32 is subjected. Shield 29 has a surface shown as edge 30 that, in correspondence to the leading of the magnetic element by shield 21, is located closely adjacent the leading margins of terminal surfaces 27, 28 but is narrowly spaced from them, and it extends transverse to the relative movement direction between the outer ends of those margins.

To make the change in magnetic flux in the core piece as great and as rapid as possible, it is preferable to shape the polar extremities of magnetic element 15 to concentrate the field along the edges of surfaces 19, 20 adjacent which the shield extends. This may be accomplished by reducing the dimension of arms 17, 18, in the direction of relative movement and adjacent the polar surfaces 19, 20, and at the side of the edges of surfaces 19, 20 adjacent which the shield extends. In Fig. 1 it is accomplished by cut-away recesses in the leading element arms 17, 18 adjacent surfaces 19, 20. To prevent saturation and spraying of magnetic force from the pickup element core piece 23, it preferably is enlarged in a portion intermediate terminal surfaces 27, 28, as by an auxiliary core piece member 31 that is of substantially U-shaped form, and is mounted in registration with the portion of the main element adjacent the cross arm. The auxiliary core piece member has side arms 32, 33 which are shorter than those of the main member and terminate inwardly of the terminal surfaces of the latter. For spacing shield 29 from the ends of the core piece side arms, a shim of material having non-magnetic properties, as brass, may be employed. Such a shim is shown at 34 and may comprise a U-shaped member having side arms registered with the end portions of side arms 25, 26, and a cross arm that extends between the latter side arms and between them and shield 29.

Advantageously, the shields 21 and 29 are thin plates of material of high magnetic permeability having rebent edges. The shield 21 of the magnetic element assembly advantageously extends into the recess provided by the above-noted reduction of the thickness of magnetic element arms 17, 18. The edge of shield element 29 advantageously contacts the surface of the low permeability shim element 34.

Referring to Fig. 6, which is a graph of a typical voltage pulse generated by moving one of the magnetic and pickup assemblies of Fig. 1 past the other, it will be seen that the arrangement of shields 21, 29 in narrow spacing from the margins of the polar and terminal surfaces that are leading with respect to the direction of relative movement tend to prevent magnetic energization of core piece 23 until the trailing edge 22 of shield 21 has passed the leading edges of terminal surfaces 27, 28 and the trailing edge of shield 29 has passed the leading edges of polar surfaces 19, 20, at which time these surfaces are suddenly exposed to a magnetic field of substantial intensity, and that is concentrated along the leading edges of surfaces 19, 20 by the shaping of arms 17, 18. This, of course, results in a most rapid change in rate of cutting magnetic force lines by the core piece 23, and consequently results in an almost instantaneously rising voltage pulse in coil 53. As indicated by the graph, there is some stray magnetic field effect prior to the noted passage of the shields, but the gradually rising voltage resulting from this stray field is negligible. The pulse voltage diminishes quite rapidly when the magnetic field of the coil core is fully established by the magnet. If the object is to use only the steep face of the pulse, the subsequent behavior of the voltage is not important. It is to be noted that reversal of the shields, to lie along the trailing edges of surfaces 19, 20, 27, 28, similarly would result in a sudden change of output voltage accompanying the sudden movement of the core piece across a sharply defined, decreasing magnetic field region.

Figs. 2 to 5 disclose various details of mounting structure for magnetic element and pickup assemblies of the type disclosed by Fig. 1. A flywheel is designated 35, and it is assumed that this flywheel is driven at a constant rate of speed so that its successive passage through a particular angular position serves as an accurate timing indicator. Associated with flywheel 35 is a stationary structure 36 which appears in Fig. 3. In the arrangement shown the magnetic element assembly is mounted on the flywheel and the pickup assembly is mounted on the stationary structure 36, an arrangement which is convenient when a permanent magnet is used as the magnetic element, since no provision need be made for electrical energization of the flywheel mounted assembly.

Flywheel 35 is provided adjacent its periphery with an annular surface 36 and the magnetic element assembly is secured to the flywheel in front of this surface. The mounting for the assembly includes a bracket 38 that is secured to the flywheel and that has a slideway 39 that provides a radial guide for a supporting block 40. Block 40 has a slot 41 that is disposed radially of the flywheel when the assembly is mounted and wherein is mounted the magnetic element 15, the latter being suitably secured as by set screws. The slot is so disposed and element 15 is so mounted therein that its polar surfaces 19, 20 are spaced apart transversely of the direction of movement of the flywheel. Shield element 21 is shown as a thin plate having a body portion 42 secured to the surface of supporting block 40 that is leading with respect to the direction of flywheel rotation, and shield 21 has a flange portion 43 that is off-bent relative to body 42 to overlie the end surface of block 41 and extend into the relation to the end portions of magnetic element side arms 17, 18, described above.

Suitable means may be provided for radially adjusting the position of element 15, such means being shown as a screw 44 supported in a bracket 45 and threaded into block 40. A spring 46 bears oppositely upon bracket 45 and block 40 to prevent relative movement of the block and screw after adjustment.

The pickup assembly comprises a supporting block 50 that may have a positioning flange 51 engaged in a suitable recess 52 of stationary structure 36 and a body portion extended outward from the flange to project from the surface of structure 36 into such relation to the magnetic element assembly that the latter passes it as the flywheel passes through a preselected angular position. Supporting block 51 is provided with a chamber 52 for reception of a coil 53 that surrounds the cross arm portion of the core piece 23. The latter is secured in a slot 54 in the body portion of supporting block 50. This slot is radially disposed with respect to the flywheel and it opens through the side of the body of block 50 that is passed by magnetic element polar surfaces 19, 20, as the wheel rotates. Advantageously, a surface portion 55 of this side of the block and that leads slot 54 is inset from a surface portion 56 that trails the slot. Shield 29 has a body portion 57 that is secured to the leading side of the body of block 50 and a flange portion 58 that is off-bent relative to that body portion and that overlies the leading surface portion 55.

Supporting block 50 is provided with suitably insulated terminal element 59 to which the opposite ends of coil 53 are connected.

Figs. 7 and 8 disclose a marine depth recording instrument having a timing system arranged in accordance with the above description of voltage pulse generating means. In this assembly a flywheel, which is again designated 35, is mounted behind a structure corresponding to stationary structure 36 and which is shown as an annular plate 60 that is adjustably rotatable on a main supporting member 61. In this arrangement a plurality of pickup assemblies 62 are supported on ring 60 for successive passing by a single magnetic element assembly 63. The various assemblies 62 may be connected selectively to energize a supersonic transmitter respectively for measurement and recording of depths in different ranges, and an additional adjustment mechanism, designated generally 64, is provided to compensate for variables of depth, such as tide. The device also includes a recorder head 65 that is energized in response to receipt of reflected vibrations to make appropriate markings on a depth chart that is driven in a preselected relation to rotation of flywheel 35. These various expedients are previously known in depth finding and recording.

Figure 9:
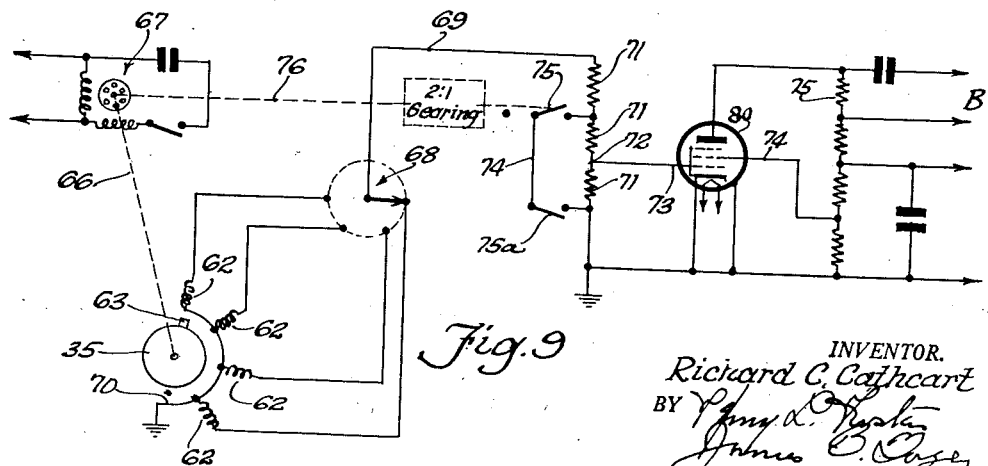
Fig. 9 is a schematic showing of a voltage pulse generating system of the kind employed in Fig. 7 and having its output connected with a specialized amplifier stage for amplifying and shaping the pulse to a more desirable form.

In Fig. 9 a circuit arrangement is shown for employing the voltage pulse outputs of a series of pickup devices 62 arranged as in Fig. 7. Previous arrangements of depth finders and recorders having the general characteristics described by Figs. 7 and 8 have included means for selectively triggering the transmitter either at every revolution or at every other revolution of the flywheel, and the schematic diagram of Fig. 9 includes provision for so triggering a transmitting system.

In the arrangement of Fig. 9, flywheel 35 is shown as driven through a mechanical connection 66 from a constant speed motor 67. The series of pickup devices 62 is arranged about the path of the magnetic element assembly 63 and a selector switch 68 is arranged to connect an output line 69 with any selected one of the pickup assemblies.

The output line 69 is connected through a common return line 70 to corresponding ends of the coils of the pickup assemblies 62 through a series of resistances 71. At an intermediate point 72 of the resistance series an amplifier and pulse shaping stage control grid 73 is connected for selectively applying a triggering signal to grid 73 at each or at alternate passages by the magnetic element assembly 63 of a connected pickup device 62. A circuit is arranged to short circuit the resistances to either side of point 72 at alternate passages of the connected pickup by assembly 63. This circuit comprises a line 74 that is connectible at its opposite ends to return line 70 and to a point in the resistance series opposite to the input side of point 72. At one end of line 74 is a switch 75 which is intermittently closed by a suitable mechanical drive 76 which advantageously may include a switch-closing cam to close switch 76 during travel of magnetic element 63 past the pickup devices 62. At the other end of circuit line 74 is a switch 75a that is manually closable to short circuit voltage pulses around grid 73. This particular arrangement of a shorting circuit around point 72 was adopted when it was found that a switch arranged to connect grid 73 to return line 70, or a switch arranged to open line 69, were both unreliable in preventing application of a triggering signal to grid 73 by each passage by magnetic device 63 of a pickup 62 connected by switch 68 to the grid. Such spurious triggering of grid 73 is prevented by the illustrated arrangement of resistance connected between grid 73 and return line 70, the isolation of the voltage coil terminal from grid 73 by an intervening resistance and the provision of a short circuit path around these two resistances and to return line 70.

The amplifying and pulse-shaping stage, of which grid 73 comprises the control input, is a conventional pentode amplifier tube having its screen grid 74 connected to a source of low voltage that is positive relative to its cathode voltage, say of the order of 20 volts. Due to the connection of grid 73 to the cathode return, which is accomplished by the resistance 71 connected between the grid and the return line 70 to which the cathode is also connected, and the application of positive voltage to the anode of the tube, the latter normally conducts a substantial current and consequently the voltage of its anode, which is connected to a positive source through a resistance 75, is quite low. The coils of the pickup devices 62 are so connected that the output voltage pulse generated by the magnetic element in passing the pickup and applied to grid 73 is negative and it is of sufficient amplitude to drive grid 73 sufficiently negative to substantially reduce the anode current and consequently produce a sharp positive voltage pulse of substantial amplitude at the anode of the tube.

An additional aspect of the invention relates to triggering of a supersonic vibration transmitter from a remote location and by sharp voltage pulses.

Figure 10:
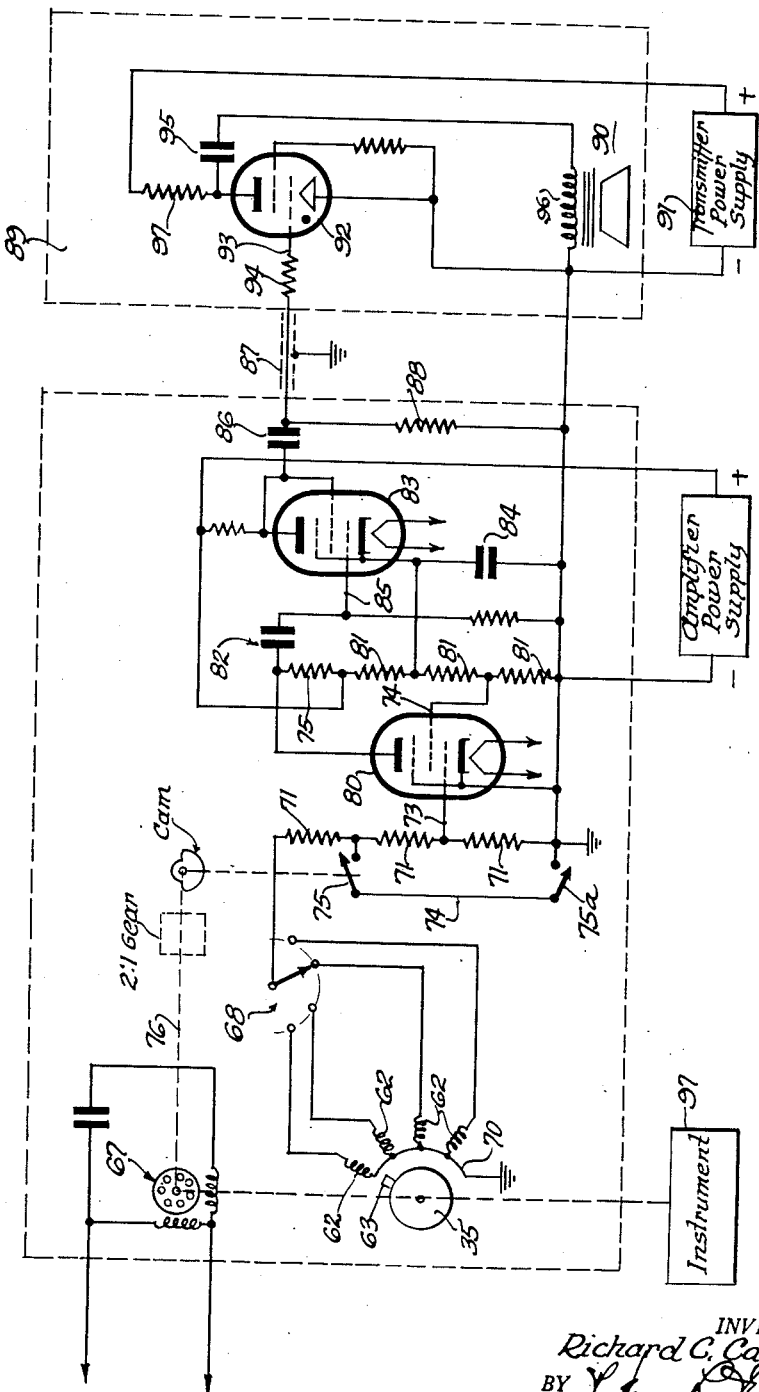
Fig. 10 is a complete schematic diagram of a system arranged in accordance with the invention for energizing a supersonic vibration transmitter by voltage pulses generated by the magnetic element and pickup assemblies forming another aspect of the invention.

The amplitude of a voltage pulse generated in a coil by passing its magnetic pickup element through a magnetic field depends on the rate of change in the numbers of magnetic field force lines cut by the pickup element. The voltage pulse generating system described above is so arranged that there is an almost infinite change in the number of field force lines cut by the terminal surfaces of the pickup element when they pass the edge of the shield of the magnetic element. Due to this almost instantaneous change the pulse rises almost instantaneously and then falls rather quickly. This makes the pulse narrow, that is to say, of brief duration. In marine depth sounding a transmitter for periodically generating supersonic vibrations during intervals of preselected length and occurring at a preselected repetition rate is located at the external sheathing of a ship. A triggering timing arrangement is located at some convenient point in the ship, usually at a substantial distance from the transmitter. It is customary to provide the transmitter with its own power supply located adjacent the point of transmitter mounting. This customary arrangement involves the transmission of a triggering pulse from the control location to the transmitter location. To avoid accidental triggering of the transmitter, it is customary to connect it with the control location by an electrostatically shielded cable. In triggering by a magnetic voltage pulse generator of the kind described above, the short rise time of the voltage triggering pulse requires a considerable charging current to charge the capacitance of the shielded transmission cable between the timing and the transmitter units. The system arrangement now to be described overcomes this problem and makes provision for energizing the transmitter with voltage pulses of satisfactory duration and accurately-timed rises from the sharp and short voltage pulses produced by the magnetic timing device. Fig. 10 discloses the system. The magnetic timing system that generates the initial voltage pulses is that already described, and the same reference numerals are applied to it. Grid 73 is the control grid of a pentode amplifier tube 80. The screen grid of this tube is connected in a voltage dividing resistance string 81 at a voltage point of approximately 20 volts positive relative to the tube cathode. As described above, the negative output pulses from the timing device applied to grid 73 serve to cut off the anode current of tube 80 and produce at its anode a sharp positive voltage pulse. Connected in cascade with tube 80 is an amplifier stage 82 comprising a power pentode tube 83. The cathode of this tube is connected to a suitable positive voltage and is shown as connected at an intermediate point of voltage divider string 81. A capacitor 84 is connected across the resistance that is connected in series with the cathode of tube 83. The control grid 85 of tube 83 is resistance-capacity connected with the anode of tube 80. By this arrangement, in the quiescent state tube 83 is biased beyond anode current cut-off by grid 85 when the positive voltage pulse is produced at the anode of tube 80, tube 83 is driven into conduction and a sharply rising negative voltage pulse is produced at its anode. Capacitor 84 is sufficiently large to stabilize the cathode of tube 83 during the pulse intervals. Tube 83 must have sufficient power handling ability to provide for reliable triggering of the supersonic vibration transmitter through a shielded cable of substantial length.

The anode of tube 83 is resistance-capacity coupled through a capacitor 86 to an output line that comprises the conductive line of the shielded cable 87. A resistance 88 provides for recharging capacitor 86 after termination of a negative voltage pulse at the anode of tube 83 and the consequent discharge of capacitor 86.

The transmitter station 89 of the system includes a supersonic vibration transmitter 90 that may be of conventional form and that operates to generate supersonic vibrations when energized by a current pulse of substantial magnitude. The station includes a direct current power supply 91 and a cold cathode gas discharge tube 92 having its cathode and anode connected in series across power supply 91. The control grid 93 of tube 92 is connected with the conductive line of cable 87 through a resistance 94. When a negative pulse is imposed on the grid 93, the grid discharges electrons to one of the electrodes of tube 92, thereby ionizing the gas in the tube and setting it into substantial conduction. A capacitor 95 of substantial capacity is connected in series with the windings 96 of transmitter 90 and tube 92. During non-conduction of tube 92 this capacitor charges to the voltage of supply 91. Following triggering of tube 92 the capacitor discharges rapidly producing a heavy current pulse through the transmitter. In this manner stored energy from the capacitor is suddenly transferred to the transmitter. Following discharge of capacitor 95 ionization ceases in tube 92 and the capacitor recharges from the power supply. The pulse power delivered to the transmitter is determined by the value of capacitor 95, voltage of 91, resistance of 97 and pulse repetition rate.

It will be seen from the immediately foregoing description that the system provides for accurately timed and sure energization of a supersonic transmitter triggered from a remote location by voltage pulses of the character delivered by the magnetic triggering voltage pulse generator described above.

In a complete sounding system an indicator instrument 97 is driven in timed relation to the flywheel 35 and an amplifier is arranged to pick up reflected vibrations and trigger the indicator in such a manner as to give an indication of the time elapsed between the generation of a triggering voltage pulse and the reception of reflected vibrations. The indicator may include a recorder on which a record of the elapsed time is indicated. It will be seen that the different locations of the plural pickup devices 62 along the path of travel of the magnetic element assembly 63 alters the significance of the elapsed time between a triggering pulse generated by one of them and the triggering of the indicator device by the reflected vibrations.

I claim:

1. Mechanism for generating a sharp voltage pulse, comprising a substantially U-shaped magnetic element having spaced polar surfaces, a core piece of magnetically permeable material having similarly spaced terminal surfaces and an output coil inductively linked with said core piece, relatively movable structures respectively supporting said element and core piece with the said polar surfaces of the one and the said terminal surfaces of the other respectively spaced transverse to the direction of their relative movement and relatively disposed with respect to the direction of the respective said surfaces for passage of said core piece terminal surfaces through the field of said magnet, and a pair of magnetically permeable shields respectively supported by said structures in slightly spaced relation to the margins of said surfaces that correspond, with respect to said direction of relative movement, said shields respectively being extended transverse to the said direction and at least between the relatively outer lateral margins of the respective polar and terminal surfaces.

2. In timing mechanism that includes a flywheel structure, means for rotating said flywheel structure at constant preselected speed, and a stationary structure adjacent the path of a portion of said flywheel structure; means for generating sharp voltage pulses comprising a substantially U-shaped magnetic element mounted on one of said structures and a magnetically permeable substantially U-shaped core piece mounted on the other and having an output coil inductively linked with it, said magnetic element and core piece respectively having at the ends of their arms a pair of substantially coplanar polar surfaces and a pair of substantially coplanar terminal surfaces and said element and core piece being so disposed on the structures supporting them that the respective surfaces of each pair are spaced apart transversely to the direction of their relative movement as said flywheel rotates and said surfaces are positioned for passage of the terminal surfaces through the field of said magnetic element, and first and second of magnetically permeable shields respectively mounted on said element and core piece carrying structures, said shields respectively being in narrowly spaced relation to the margins of said polar and terminal surfaces that are corresponding with respect to said direction of relative movement and said shields being extended transversely of said direction and between the relatively outermost margins of said surfaces.

3. In timing mechanism that includes a flywheel structure, means for rotating said flywheel structure at constant preselected speed, and a stationary structure adjacent the path of a portion of said flywheel structure; means for generating sharp voltage pulses in accordance with claim 2, wherein reaches of the arms of said magnetic element piece adjacent said polar surfaces are reduced in thickness in the direction of their relative movement during flywheel structure rotation.

4. In timing mechanism that includes a flywheel structure, means for rotating said flywheel structure at constant preselected speed, and a stationary structure adjacent the path of a portion of said flywheel structure; means for generating sharp voltage pulses in accordance with claim 2, wherein said core piece terminal surfaces are narrower than said magnetic element terminal surfaces in the direction of their relative movement during flywheel structure rotation.

5. In timing mechanism that includes a flywheel structure, means for rotating said flywheel structure at constant preselected speed, and a stationary structure adjacent the path of a portion of said flywheel structure; means for generating sharp voltage pulses in accordance with claim 2, wherein reaches of the arms of said element, adjacent said polar surfaces and at the sides adjacent said first shield, are reduced in the direction of said relative movement.

6. In timing mechanism that includes a flywheel structure, means for rotating said flywheel structure at constant preselected speed, and a stationary structure adjacent the path of a portion of said flywheel structure; means for generating sharp voltage pulses in accordance with claim 2, wherein reaches of the arms of said magnetic element adjacent said polar surfaces are reduced, providing shoulders spaced inward from said surfaces and to the sides of said arms adjacent said shield, and wherein the shield element mounted on the structure supporting said element overlies said shoulder in narrowly spaced relation thereto.

7. In timing mechanism that includes a flywheel structure, means for rotating said flywheel structure at constant speed, and a stationary structure adjacent the path of a portion of said flywheel structure; means for generating sharp voltage pulses, in accordance with claim 2, wherein said magnetic element comprises a permanent magnet, magnetization of which is below the degree necessary to saturate either of said shields.

8. In timing mechanism that includes a flywheel structure, means for rotating said flywheel structure at constant speed, and a stationary structure adjacent the path of a portion of said flywheel; means for generating sharp voltage pulses, in accordance with claim 2, wherein said core piece comprises a thin substantially U-shaped main member having side arms and a cross arm, and an auxiliary thin substantially U-shaped member having its cross arm registered with and contacting the cross arm of the main member and side arms shorter than the main member and registered with and contacting them.

9. In timing mechanism that includes a flywheel structure, means for rotating said flywheel structure at constant speed, and a stationary structure adjacent the path of a portion of said flywheel; means for generating sharp voltage pulses, in accordance with claim 2, wherein said core piece comprises a thin, substantially U-shaped main member having side arms and a cross arm, and a thin auxiliary U-shaped auxiliary member positioned at the side of said member adjacent said second shield and having a cross arm registered with and contacting said main member and side arms shorter than and contacting the respective main member side arms, and shim means of low magnetic permeability extended along the main member side arms between their ends and the auxiliary member side arms, and wherein the shield that is mounted on the core piece supporting structure contacts said shim means.

10. A magnetic element assembly for generating a sharp voltage pulse by passing a magnetic pickup device, said assembly comprising a supporting block of low magnetic permeability having therein a slot that opens through one of its surfaces, a substantially U-shaped magnetic element secured in said slot and having arms provided with substantially coplanar and surfaces, that are exposed through said block surface, and a shield of high magnetic permeability secured to said block and having a surface narrowly spaced from corresponding margins of said polar surfaces and extending at least between the relatively remote lateral ends of said margins.

11. A voltage generating assembly for energization by passing through a magnetic field to produce a sharp voltage pulse, said assembly comprising a supporting block of low magnetic permeability having a slot opening between two surface portions of a side of said block, a thin substantially U-shaped core piece of high magnetic permeability mounted in said slot and having terminal surfaces exposed at said block side, and a shield of high magnetic permeability secured to said block in overlying relation to one of said surface portions, said shield being narrowly spaced from corresponding margins of said terminal surfaces and extending at least between the relatively outer ends of said margins.

12. A voltage generating assembly according to claim 11, wherein the surface portion of the block that said shield overlies is spaced inwardly of the other said surface portion, and wherein the latter surface portion, said core piece arm terminal surfaces, and an outer surface of said shield, are substantially flush with one another.

13. In timing mechanism that includes a flywheel having a rotatable face portion, means for rotating said flywheel at constant speed, and supporting structure spaced from said face portion; means for generating a sharp voltage pulse as said flywheel passes through a preselected angular position, comprising a first supporting block of low magnetic permeability secured to said flywheel and positioned in front of said face portion, said block having a pair of arms spaced in the direction of wheel rotation and defining between them a slot that is extended radially of said flywheel, a substantially U-shaped magnetic element secured in said slot with end portions of its arms projecting beyond said block and with end polar surfaces disposed in substantially coplanar relation and spaced transverse to said direction to travel in annular paths as the flywheel is rotated, a shield of high magnetic permeability having a body portion secured to the side of said block that is leading with respect to said direction and having a flange portion offbent from said body, overlying the leading portion of the surface thereof through which said magnet element arms project, extending at least between the relatively outermost margins of said polar surfaces and having an edge narrowly spaced from the leading margin of the latter, a second supporting block of low magnetic permeability mounted on said structure and having a surface disposed for being passed by said magnetic element polar surfaces as the flywheel passes through said angular position, said second block having therein a slot disposed radially relative to said flywheel and opening through its said surface, a thin U-shaped core piece of high magnetic permeability mounted in said slot and having at the ends of its arms terminal surfaces disposed to pass through the field of said magnetic element as the flywheel passes through its said position, a shield of high magnetic permeability having a body portion secured to the side of said second supporting block toward which said magnetic element polar surfaces move as the flywheel approaches its said angular position and an offbent flange portion overlying a portion of said surface of the second supporting block between said side and the slot thereof, extending at least between the relatively outermost margins of said terminal surfaces and having an edge narrowly spaced from corresponding margins thereof, and a coil linked with said core piece.

14. In a system arranged for periodic operation instituted by periodic voltage pulses and including a stationary structure, and a structure movable cyclically to pass periodically through a preselected positional relation to said stationary structure; a triggering voltage pulse-generating system comprising a magnetic element mounted on one of said structures and a magnetically energizable pickup device mounted on the other said structure for energization by passing through the field of said element as the structures pass through said positional relation and to produce across an output a voltage pulse when so energized, resistance connected across said output, an amplifier stage including an amplifier tube having a cathode connected with a first side of said output and a control grid connected with an intermediate point of said resistance, a by-pass circuit having a first end connected with said first output side, a second end connected between the second side of said output and said control grid and connected with the latter by at least a portion of said resistance, said by-pass circuit including a switch that is closeable and openable to establish and interrupt said circuit, and mechanism for closing said switch in synchronism with passage of said structures through their said preselected positional relation during cycles having a preselected ratio to the cycles of movement of said movable structure.

15. A system for periodically energizing a supersonic vibration transmitter with current pulses of preselected frequency and duration triggered from a remote control station through a long shielded cable, said system comprising; power means for the transmitter arranged at the location of the latter and including a cold cathode gaseous discharge tube having its anode and cathode connected across said power means and its anode resistance-capacity coupled to the energizing circuit of said transmitter; an electrostatically shielded cable having an internal conductive line connected with the control grid of said tube; an electronic amplifier system having an output coupled with said conductive line, and a control input, and arranged to produce at its said output a current pulse of selected duration and magnitude upon triggering of its input by a substantially instantaneous voltage pulse; and a triggering voltage pulse generator comprising relative and cyclically movable magnetic element and pickup assemblies, the latter of which includes magnetic circuit means energizable by movement relative to the field of the magnetic element of the former and electrical means for producing an output voltage during such energization, and each of said assemblies including a shield arranged to distort said magnetic field for producing a sudden change in rate of cutting force lines of said field by said magnetic circuit means, and circuit means for applying the voltage output of said electrical means to said amplifier system input.

16. A triggering voltage pulse system comprising a substantially U-shaped magnetic element having spaced polar surfaces, a core piece of magnetically permeable material having terminal surfaces spaced apart for passing through the field of said magnetic element, relatively movable structures respectively supporting said element and core piece with the said polar surfaces of the one and the said terminal surfaces of the other spaced transverse to the direction of their relative movement and relatively disposed for passage of said terminal surfaces through said field, a pair of shields of high magnetic permeability respectively supported by said structures in slightly spaced relation to the leading margins, with respect to said direction of relative movement, said shields respectively being extended transverse to said directions of relative movement and at least between the relatively outer margins of said surfaces, a winding linked with said core piece, whereby as said coil passes through a margin of a portion of the field of said magnet extending past said shield a substantially instantaneously changing output voltage pulse is generated therein, an amplifying stage including an amplifying tube having a cathode connected with one end of said coil, a control grid coupled with the other, and bias means for maintaining a preselected state of conductivity of said tube in the absence of an output voltage pulse of said coil.

17. A triggering voltage pulse system according to claim 16, wherein said bias means is arranged to maintain said tube in a state of conduction, and said cathode, control grid and coil are connected to drive said grid negative relative to said cathode during passage of said terminal through said magnetic element field, sufficiently to render said tube non-conductive.

References Cited in the file of this patent

UNITED STATES PATENTS

| Number | Name | Date |
| --- | --- | --- |
| 2,255,652 | Dawson | Sept. 9, 1941 |
| 2,305,574 | Koehl | Dec. 15, 1942 |
| 2,514,668 | Parker | July 4, 1950 |
| 2,535,353 | Drake | Dec. 26, 1950 |
| 2,556,471 | Elam | June 12, 1951 |

FOREIGN PATENTS

| Number | Country | Date |
| --- | --- | --- |
| 508,347 | Great Britain | June 29, 1939 |